United States Patent
Gupta

(10) Patent No.: US 8,831,080 B2
(45) Date of Patent: Sep. 9, 2014

(54) APPARATUS AND METHOD FOR CHANNEL QUALITY FEEDBACK WITH A K-BEST DETECTOR IN A WIRELESS NETWORK

(71) Applicant: Samsung Electronics Co., Ltd., Suwon-si (KR)

(72) Inventor: Ankit Gupta, Redmond, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 101 days.

(21) Appl. No.: 13/632,967

(22) Filed: Oct. 1, 2012

(65) Prior Publication Data

US 2013/0083835 A1  Apr. 4, 2013

Related U.S. Application Data

(60) Provisional application No. 61/543,195, filed on Oct. 4, 2011.

(51) Int. Cl.
| | | |
|---|---|---|
| *H04B 3/46* | (2006.01) | |
| *H04B 17/00* | (2006.01) | |
| *H04Q 1/20* | (2006.01) | |
| *H04B 7/04* | (2006.01) | |
| *H04B 7/06* | (2006.01) | |

(52) U.S. Cl.
CPC ............ *H04B 7/0632* (2013.01); *H04B 7/0639* (2013.01); *H04B 7/0417* (2013.01); *H04B 7/063* (2013.01)
USPC ........... 375/227; 375/316; 370/252; 370/464; 370/500; 370/491

(58) Field of Classification Search
CPC .. H04B 7/0452; H04B 7/0413; H04B 7/0639; H04B 7/0632; H04B 7/04; H04B 7/0417; H04B 7/0404; H04B 7/0486; H04L 5/006
USPC ......... 375/224, 227–228, 259–260, 316, 340, 375/342, 347; 370/252, 464, 465, 469, 480, 370/498, 500, 491
See application file for complete search history.

(56) References Cited

U.S. PATENT DOCUMENTS

| | | | |
|---|---|---|---|
| 7,486,655 B2* | 2/2009 | Ting et al. | 370/343 |
| 8,019,031 B2* | 9/2011 | Yoshida et al. | 375/349 |

(Continued)

FOREIGN PATENT DOCUMENTS

| | | |
|---|---|---|
| KR | 2006/0005946 A | 1/2006 |
| KR | 2007/0046976 A | 5/2007 |

(Continued)

OTHER PUBLICATIONS

International Search Report dated Mar. 28, 2013 in connection with International Patent Application No. PCT/KR2012/008047, 3 pages.

*Primary Examiner* — Jean B Corrielus

(57) ABSTRACT

A receiver in a multiple input, multiple output (MIMO) system is configured to perform a method for generating channel quality feedback information. The method includes receiving, from a MIMO transmitter, pilot signals in each MIMO layer. The method also includes estimating the MIMO channel using the received pilot signals and performing a QR decomposition of the estimated MIMO channel. The method further includes predicting a probability of error for each MIMO layer after the QR decomposition of the estimated MIMO channel. The method still further includes determining a corresponding signal-to-noise ratio (SNR) for each MIMO layer based on the probability of error for the each MIMO layer.

20 Claims, 4 Drawing Sheets

(56) References Cited

U.S. PATENT DOCUMENTS

| | | | |
|---|---|---|---|
| 2003/0003863 A1* | 1/2003 | Thielecke et al. | 455/39 |
| 2008/0056396 A1* | 3/2008 | Li | 375/260 |
| 2010/0124301 A1* | 5/2010 | Bahng et al. | 375/341 |
| 2010/0238824 A1* | 9/2010 | Farajidana et al. | 370/252 |
| 2010/0239043 A1* | 9/2010 | Li et al. | 375/267 |

FOREIGN PATENT DOCUMENTS

| | | |
|---|---|---|
| KR | 2008/0016885 A | 2/2008 |
| KR | 2011/0030471 A | 3/2011 |

\* cited by examiner

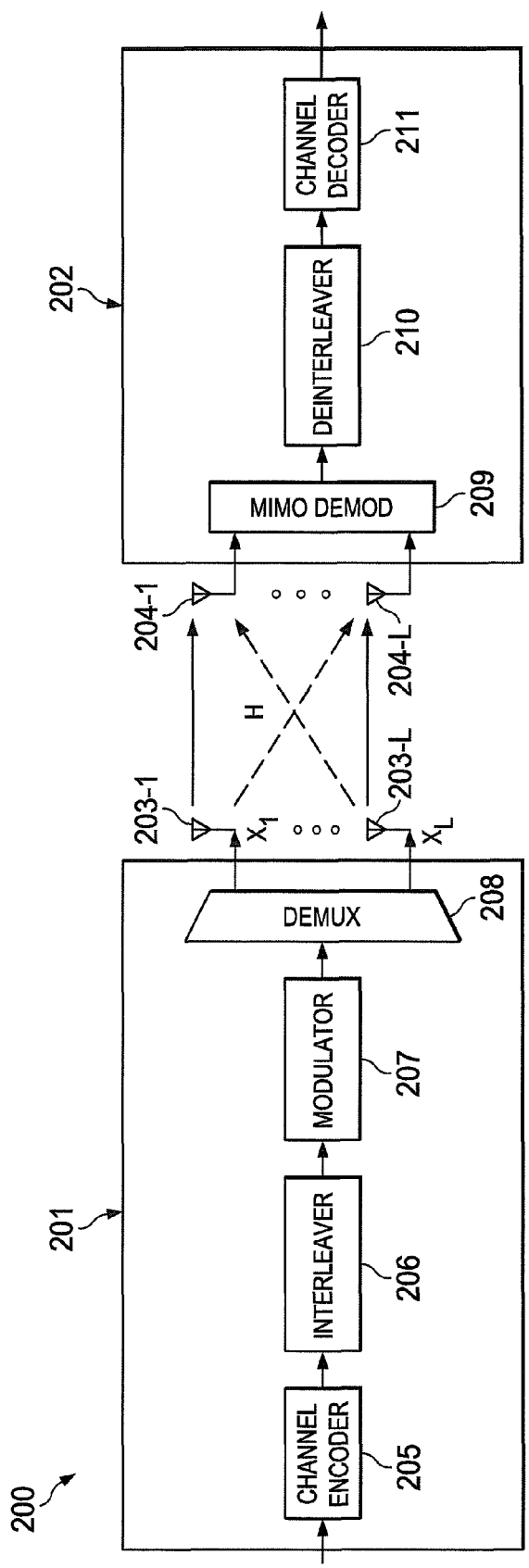
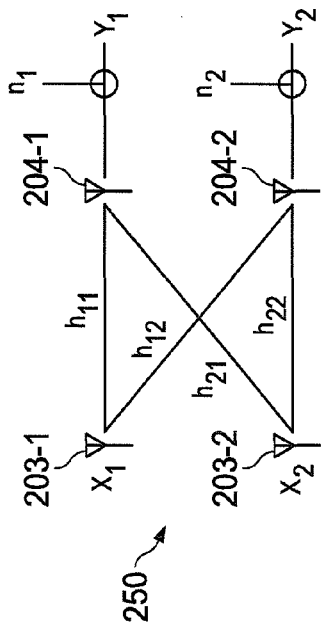
FIG. 2A
FIG. 2B

APPARATUS AND METHOD FOR CHANNEL QUALITY FEEDBACK WITH A K-BEST DETECTOR IN A WIRELESS NETWORK

CROSS-REFERENCE TO RELATED APPLICATION(S) AND CLAIM OF PRIORITY

The present application claims priority to U.S. Provisional Patent Application Ser. No. 61/543,195, filed Oct. 4, 2011, entitled "METHOD AND APPARATUS FOR FEEDBACK WITH K-BEST DETECTOR". The content of the above-identified patent documents is incorporated herein by reference.

TECHNICAL FIELD

The present disclosure relates generally to determination of feedback in wireless mobile communication systems and, more specifically, to an improved channel quality feedback algorithm that is suitable for use with a K-Best detector.

BACKGROUND

Detection of signals and providing periodic channel quality feedback in multiple input, multiple output (MIMO) wireless transmission systems presents a challenging problem involving complex and extensive computations. For mobile handsets, the number of computations that must be performed to provide feedback for each transmitted symbol can require substantial power consumption, decreasing battery life.

SUMMARY

For use in a receiver in a multiple input, multiple output (MIMO) system, a method for generating channel quality feedback information is provided. The method includes receiving, from a MIMO transmitter, pilot signals in each MIMO layer. The method also includes estimating the MIMO channel using the received pilot signals and performing a QR decomposition of the estimated MIMO channel. The method further includes predicting a probability of error for each MIMO layer after the QR decomposition of the estimated MIMO channel. The method still further includes determining a corresponding signal-to-noise ratio (SNR) for each MIMO layer based on the probability of error for the each MIMO layer.

For use in a receiver in a MIMO system, an apparatus configured to generate channel quality feedback information is provided. The apparatus includes a processor. The processor is configured to receive, from a MIMO transmitter, pilot signals in each MIMO layer. The processor is also configured to estimate the MIMO channel using the received pilot signals and perform a QR decomposition of the estimated MIMO channel. The processor is further configured to predict a probability of error for each MIMO layer after the QR decomposition of the estimated MIMO channel. The processor is still further configured to determine a corresponding signal-to-noise ratio (SNR) for each MIMO layer based on the probability of error for the each MIMO layer.

A receiver configured for use in a MIMO system and capable of generating channel quality feedback information is provided. The receiver includes a plurality of antenna elements and a processor coupled to the plurality of antenna elements. The processor is configured to receive, from a MIMO transmitter, pilot signals in each MIMO layer. The processor is also configured to estimate the MIMO channel using the received pilot signals and perform a QR decomposition of the estimated MIMO channel. The processor is further configured to predict a probability of error for each MIMO layer after the QR decomposition of the estimated MIMO channel. The processor is still further configured to determine a corresponding signal-to-noise ratio (SNR) for each MIMO layer based on the probability of error for the each MIMO layer.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 2A and 2B illustrate components and signals within a transmitter and a receiver for a MIMO signal transmission system in a wireless network, according to one or more embodiments of this disclosure;

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into this disclosure as if fully set forth herein:

"Evolved Universal Terrestrial Radio Access (E-UTRA); User Equipment (UE) Radio Access Capabilities (Release 10)", 3GPP Technical Specification No. 36.211, version 10.2.0, June 2011 (hereinafter "REF1"); K. Higuchi, H. Kawai, N. Maeda, M. Sawahashi, T. Itoh, Y. Kakura, A. Ushirokawa, H. Seki, "Likelihood Function For QRM-MLD Suitable For Soft-Decision Turbo Decoding And Its Performance For OFCDM MIMO Multiplexing In Multipath Fading Channel", Personal, Indoor and Mobile Radio Communications, 2004. PIMRC 2004. 15th IEEE International Symposium on, vol. 2, pp. 1142-1148, 5-8 Sept. 2004 (hereinafter "REF2"); and "Evolved Universal Terrestrial Radio Access (E-UTRA); User Equipment (UE) Radio Transmission And Reception (Release 10)", 3GPP Technical Specification No. 36.101, version 10.3.0 June 2011 (hereinafter "REF3").

MIMO antenna systems are an integral part of fourth generation communications systems such as Long Term Evolution (LTE), LTE Advanced (LTE-A) and Worldwide Interoperability for Microwave Access (WiMAX). To achieve high spectral efficiency, as many as eight antennas are supported at both the receiver and transmitter in LTE Release 10. In addition, higher order modulations such as Quadrature Amplitude Modulation with 64 constellation points (64-QAM) are used in a high signal-to-noise ratio (SNR) scenario.

Figure 1:
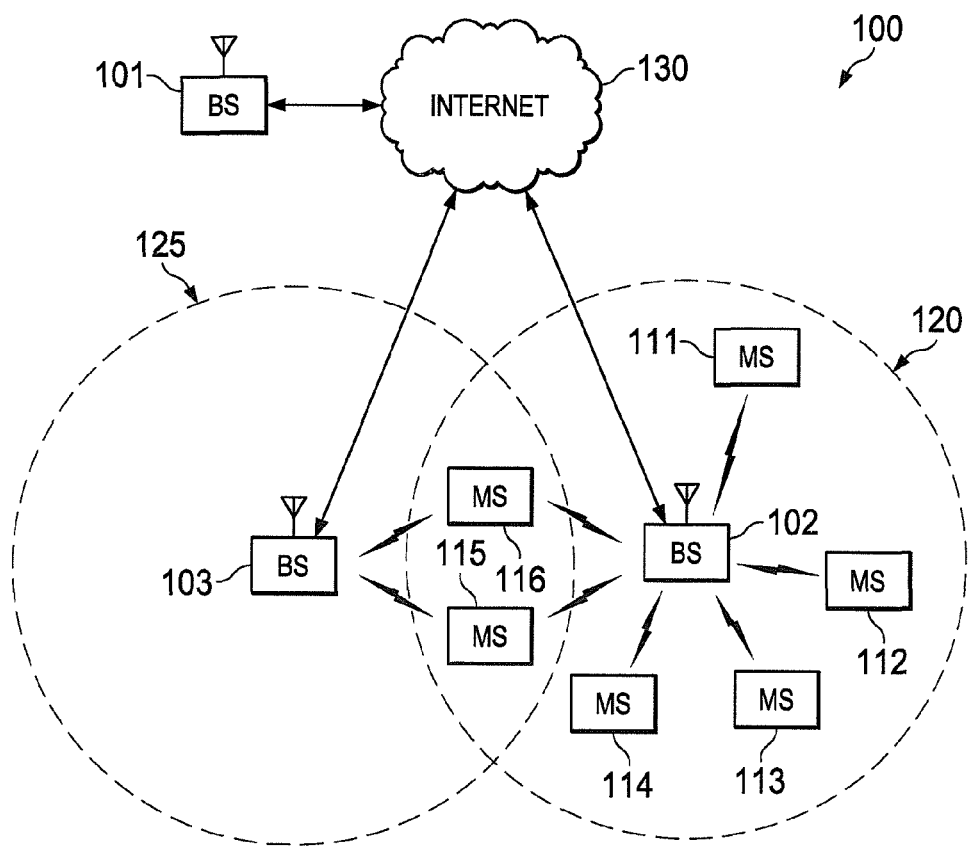
FIG. 1 illustrates an exemplary wireless network capable of implementing MIMO techniques, according to one or more embodiments of this disclosure.

FIG. 1 is a high level diagram illustrating an exemplary wireless network implementing MIMO techniques, according to one or more embodiments of this disclosure. The wireless network 100 illustrated in FIG. 1 is provided solely for purposes of explaining the subject matter of the present disclosure, and is not intended to suggest any limitation regarding the applicability of that subject matter. Other wireless networks may employ the subject matter depicted in the drawings and described herein without departing from the scope of the present disclosure. In addition, those skilled in the art will recognize that the complete structure and operation of a wireless network and the components thereof are depicted in the drawings and described therein. Instead, for simplicity and clarity, only so much of the structure and operation of the wireless network and the components thereof as are unique to the present disclosure or necessary for an understanding of the present disclosure are depicted and described.

In the illustrated embodiment, wireless network 100 includes a base station (BS) 101, BS 102, and BS 103. Depending on the network type, other well-known terms may be used instead of "base station," such as "Evolved Node B" (eNB) or "access point" (AP). For simplicity and clarity, the term "base station" will be used herein to refer to the network infrastructure components that provide or facilitate wireless communications network access to remote (mobile or fixed) terminals.

The BS 101 communicates with BS 102 and BS 103 via network 130 operating according to a standardized protocol (e.g., X2 protocol), via a proprietary protocol, or preferably via Internet protocol (IP). IP network 130 may include any IP-based network or a combination thereof, such as the Internet, a proprietary IP network, or another data network.

The BS 102 provides wireless broadband access to a first plurality of mobile stations (MSs) within coverage area 120 of BS 102. In the example illustrated, the first plurality of MSs includes MS 111, which may be located in a small business; MS 112, which may be located in an enterprise; MS 113, which may be located in a wireless fidelity (WiFi) hotspot; MS 114, which may be located in a first residence; MS 115, which may be located in a second residence; and MS 116, which may be a mobile device, such as a cell phone, a wireless laptop, a wireless-enabled tablet, or the like. For simplicity and clarity, the term "mobile station" or "MS" is used herein to designate any remote wireless equipment that wirelessly accesses or communicates with a BS, whether the MS is a mobile device (e.g., cell phone, wireless-enabled tablet or laptop, etc.) or is normally considered a stationary device (e.g., desktop personal computer, wireless television receiver, etc.). In other systems, other well-known terms may be used instead of "mobile station," such as "user equipment" (UE), "subscriber station" (SS), "remote terminal" (RT), "wireless terminal" (WT), and the like.

The BS 103 provides wireless broadband access to a second plurality of MSs within coverage area 125 of BS 103. The second plurality of MSs includes MS 115 and MS 116. In an exemplary embodiment, BSs 101-103 communicate with each other and with MSs 111-116 using MIMO techniques. While only six MSs are depicted in FIG. 1, it will be understood that wireless network 100 may provide wireless broadband access to additional MSs.

FIGS. 2A and 2B are diagrams of components and signals within a transmitter and a receiver for a MIMO signal transmission system in a wireless network, according to one or more embodiments of this disclosure.

As shown in FIG. 2A, the MIMO signal transmission system 200 includes a transmitter 201 coupled to an array of L antenna or antenna elements 203-1 to 203-L and a receiver 202 coupled to an array of L antenna or antenna elements 204-1 to 204-L, with the transmitter 201 forming part of one of BSs 101-103 and the receiver 202 forming part of one of the MSs 111-116 in the embodiment. As understood by those skilled in the art, each BS 101-103 and each MS 111-116 includes both a transmitter and a receiver each separately coupled to the respective antenna array to transmit or receive radio frequency signals over channel H, such that the transmitter 201 may alternatively be disposed within one of the MSs 111-116 and the receiver 202 may alternatively be disposed within one of the BSs 101-103.

In the example depicted, the transmitter 201 includes encoding and modulation circuitry comprising a channel encoder 205 receiving and encoding data for transmission, an interleaver 206 coupled to the channel encoder 205, a modulator 207 coupled to the interleaver 206, and a de-multiplexer 208 coupled to the modulator 207 and antenna elements 203-1 to 203-L. In the example depicted, the receiver 202 includes a MIMO demodulator 209 coupled to the antenna elements 204-1 to 204-L, a de-interleaver 210 coupled to the MIMO demodulator 209 and a channel decoder 211 coupled to the de-interleaver 210. In addition, transmitter 201 and receiver 202 may each include a programmable processor or controller including and/or connected to memory and coupled to the respective transmitter and receiver chains for controlling operation of the respective BS or MS. Using such components, synchronization signals are transmitted by a BS and received by an MS in the manner described in further detail below.

FIG. 2B illustrates an example of MIMO signal transmission. As discussed above, MIMO signal transmission utilizes multiple antenna elements at both the transmitter and receiver. The MIMO transmission arrangement 250 illustrated by FIG. 2B includes transmitter antenna elements 203-1 and 203-2 located within one of BSs 101, 102 and 103, and receiver antenna elements 204-1 and 204-2 located within one of MSs 111, 112, 113, 114, 115 and 116. For simplicity, a 2×2 MIMO system (i.e., two transmit antennas and two receive antennas) is illustrated, although those skilled in the art will understand how the mathematics discussed below extends to larger systems. The mathematical equation governing signals transmitted over channel H between antenna elements 203-1 and 203-2 and antenna elements 204-1 and 204-2 is given as:

$$\begin{bmatrix} Y_1 \\ Y_2 \end{bmatrix} = \begin{bmatrix} h_{11} & h_{12} \\ h_{21} & h_{22} \end{bmatrix} \begin{bmatrix} X_1 \\ X_2 \end{bmatrix} + \begin{bmatrix} n_1 \\ n_2 \end{bmatrix}$$

where $Y_1$ and $Y_2$ are the received signal at antenna elements 204-1 and 204-2, respectively, $X_1$ and $X_2$ are the symbols transmitted by antenna elements 203-1 and 203-2, respectively, $h_{11}$ and $h_{12}$ represent characteristics of channel H between antenna element 203-1 and antenna elements 204-1 and 204-2, respectively, $h_{21}$ and $h_{22}$ represent channel characteristics between antenna element 203-2 and antenna elements 204-1 and 204-2, respectively, and $n_1$ and $n_2$ are independent identically distributed Gaussian noise signals with variance $\sigma^2$.

MIMO detection is used to recover estimates of the bits in $X_1$ and $X_2$. Since the system is coded, interest is focused on the soft estimates (i.e., log-likelihood ratios or "LLRs") instead of the actual bits themselves, where the soft estimates are then fed to the turbo decoder. The performance of any detector is finally evaluated according to the resulting block error rate (BLER) (sometimes also referred to as frame error rate or "FER") performance as a function of the SNR.

In LTE Release 8, periodic feedback of the channel state is sent from the UE to the ENodeB. This feedback includes three components:

Channel Quality Indicator (CQI): Indicates the spectral efficiency of each layer in the channel;
Precoding Matrix Indicator (PMI): Precoder matrix to be used with the channel;
Rank Indicator (RI): The number of layers that are feasible for the channel.

Figure 3:
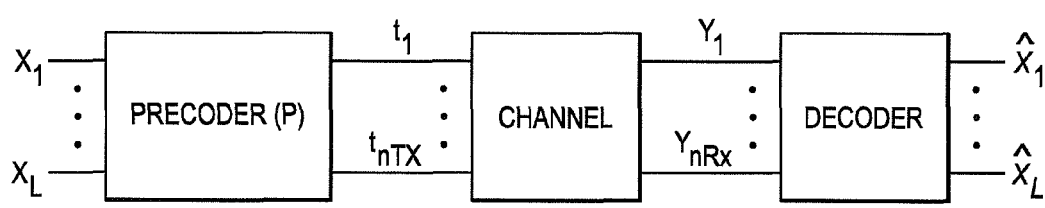
FIG. 3 depicts a representative MIMO system having nTx transmitter antennas and nRx receiver antennas.

To illustrate these concepts, FIG. 3 depicts a representative MIMO system having nTx transmitter antennas and nRx receiver antennas. The MIMO system 300 may represent one or more of the MIMO systems depicted in FIGS. 1, 2A, and 2B. The number of layers that are transmitted on the MIMO system 300 is L. The channel matrix, H, has dimensions (nRx×nTx), while the precoder matrix P has dimensions (nTx×L). The equation governing this system is given as:

$$Y = HPX + n \quad [\text{Eqn. 1}]$$

where Y is a vector of length nRx, P is the precoder matrix, X is a vector of length L, and n is a noise vector.

A Minimum Mean Square Error (MMSE) filter for the system in Equation 1 is given as:

$$F_{MMSE} = (HP)^H (HPP^H H^H + \sigma^2 I)^{-1} \quad [\text{Eqn. 2}]$$

where $\sigma^2$ is a variance of the noise. The MMSE filter is dependent on the MIMO channel H, which can be estimated at the receiver using pilot symbols transmitted from the base station.

The MMSE filter can be applied to Equation 1 to get:

$$F_{MMSE}Y = F_{MMSE}HPX + F_{MMSE}n \quad [\text{Eqn. 3}]$$

Equation 3 can be decomposed as L separate equations, each of the L equations having the form:

$$\tilde{Y}_l = \tilde{H}_{ll}X_l + \Sigma_{\{i=1, i \neq l\}}^{L} \tilde{H}_{li}X_i + \tilde{n}_l \quad [\text{Eqn. 4}]$$

where $\tilde{Y}_l$ and $\tilde{n}_l$ are the components of the vectors $F_{MMSE}Y$ and $F_{MMSE}n$ respectively, and $H_{ij}$ are the components of the L×L matrix $F_{MMSE}HP$.

Using Equation 4, the signal-to-noise ratio (SNR) for layer l can be determined as:

$$SNR_l = \frac{|\tilde{H}_{ll}|^2}{\sum_{i=1, i \neq l}^{L} |H_{li}|^2 + \tilde{\sigma}_l^2} \quad [\text{Eqn. 5}]$$

where $\tilde{\sigma}_l^2$ represents the noise variance experienced on layer l, as per equation (4).

The SNR per layer may be mapped to determine effective spectral efficiency per layer. Using the spectral efficiency per layer, it is possible to determine how much throughput can be achieved with various combinations of precoder matrices and rank. The combination that provides the best throughput can be indicated. The CQI may then be reported based on that rank and precoder.

This method of feedback is suited for an MMSE detector. However, if a K-Best detector (see REF2) is used at the receiver, then the feedback using the method described above may be suboptimal.

Figure 4:
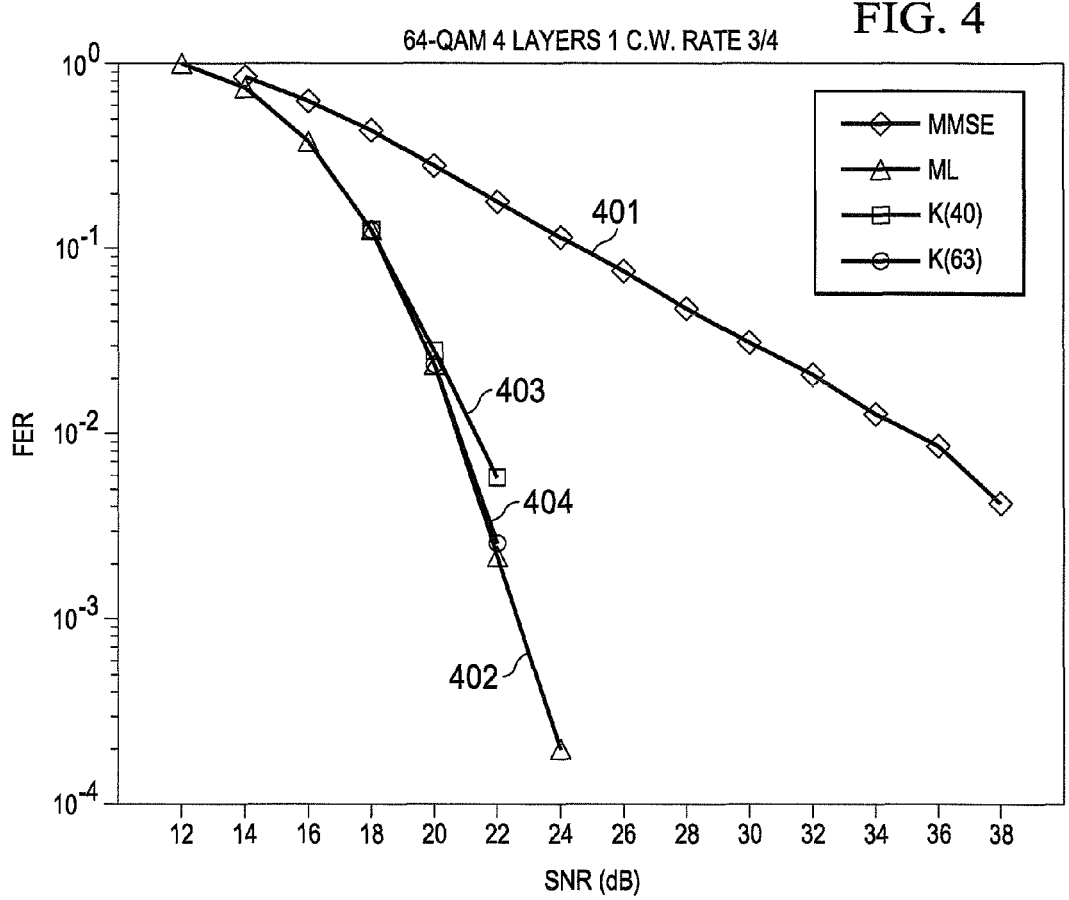
FIG. 4 illustrates performance of a K-Best algorithm compared with Minimum Mean Square Error (MMSE) and Maximum Likelihood (ML) algorithms when used over a block fading 4×4 channel, according to embodiments of this disclosure.

For example, FIG. 4 illustrates comparative performance (FER as a function of SNR) of a K-Best algorithm as compared with MMSE and Maximum Likelihood (ML) algorithms when used over a block fading 4×4 channel with 64-QAM modulation, according to embodiments of this disclosure. Trace 401 depicts performance of the MMSE algorithm, trace 402 depicts performance of the ML algorithm, trace 403 depicts performance for a K-Best detector with K=40, and trace 404 depicts performance for a K-Best detector with K=63. As shown in FIG. 4, the K-Best detector has performance close to ML, and therefore the SNR per layer and the number of layers supported is much higher than that for the MMSE detector. Thus, it is beneficial to evaluate a different metric based upon the K-Best detector. Embodiments of this disclosure describe such a metric and show performance gains over the existing MMSE metric.

The following embodiments describe a feedback algorithm that is suitable for use with a K-Best detector. The operation of the disclosed algorithm will be described with respect to a 4×4 MIMO system (i.e., 4 transmit antennas and 4 receive antennas). It will be understood, however, that embodiments of the disclosed feedback algorithm may be used with other systems, such as MIMO systems having other more or fewer antennas.

A 4×4 MIMO system, after QR matrix decomposition, may be described by the equation:

$$\begin{bmatrix} Y_1 \\ Y_2 \\ Y_3 \\ Y_4 \end{bmatrix} = \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix} \begin{bmatrix} X_1 \\ X_2 \\ X_3 \\ X_4 \end{bmatrix} + \begin{bmatrix} n_1 \\ n_2 \\ n_3 \\ n_4 \end{bmatrix}. \quad [\text{Eqn. 6}]$$

The coefficients $r_{i,j}$ are based on the MIMO channel matrix H, which is first estimated at the receiver using the pilot symbols, and then a QR decomposition of H is performed.

The K-Best detector works as follows. Beginning at layer 4, M best candidates are evaluated for $X_4$, according to the equation:

$$Y_4 = r_{44} X_4 + n_4.$$ [Eqn. 7]

The K best candidates (according to log likelihood ratios) are taken forward and KM best candidates are evaluated for the tuples $(X_3, X_4)$ according to the equation:

$$Y_3 = r_{33} X_3 + r_{34} X_4 + n_3.$$ [Eqn. 8]

Figure 5:
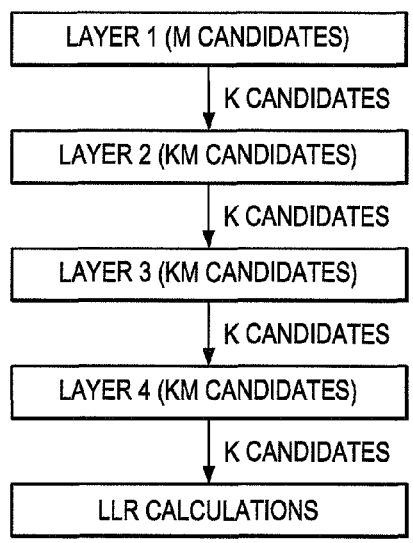
FIG. 5 illustrates a flowchart representing a K-Best algorithm.

The K tuples having the best likelihoods are then carried forward for evaluation of M candidates for $X_3$ for layer 3. A flowchart representing this process is shown in FIG. 5. At each layer i, evaluation of the best candidates can be performed, for example, based on the log likelihood computation, which is essentially equivalent to computing the Euclidean distance $|Y_i - \Sigma_{j=i}^n r_{ij} X_j|^2$.

In one embodiment of this disclosure, a metric analogous to that in Equation 5, is used to evaluate the SNR for each layer. This is most applicable to the fourth layer, for which Equation 7 may be used to compute the SNR. Thus, the SNR is given as:

$$SNR_4 = \frac{|r_{44}|^2}{\sigma^2}.$$ [Eqn. 9]

For the layers other than the fourth layer, computation of the SNR is not as straightforward. Therefore, a method to compute the SNR according to an embodiment of this disclosure is provided. This method is based upon mapping the probability of error $P_e$ to the SNR in a Binary Phase Shift Keyed (BPSK) system, which is given as:

$$P_e(BPSK) = Q\left(\frac{\sqrt{SNR}}{2}\right)$$ [Eqn. 10]

where $Q(x) = P[X \geq x]$, where $P[\ ]$ is a probability function and X is a standard Gaussian random variable. The inverse of this mapping can be used to obtain the SNR, which is given as:

$$SNR = 4 * (Q^{-1}(P_e))^2.$$ [Eqn. 11]

Thus, once the probability of error is determined for each layer, the probability can be mapped to the corresponding SNR. Let $X_1, \ldots, X_L$ be the transmitted symbols on each layer, and let $\hat{X}_1, \ldots, \hat{X}_L$ be the output of the K-Best detector. It is then seen that:

$$P[X_3 \neq \hat{X}_3] = P[X_3 \neq \hat{X}_3 | X_4 \neq \hat{X}_4] P[X_4 \neq \hat{X}_4] + P[X_3 \neq \hat{X}_3 | X_4 = \hat{X}_4] P[X_4 = \hat{X}_4].$$ [Eqn. 12]

If the fourth layer is in error, the term $r_{34}$ in Equation 6 acts as noise. Therefore, it can be determined that:

$$P[X_3 \neq \hat{X}_3 | X_4 \neq \hat{X}_4] = Q\left(\sqrt{\frac{|r_{33}|^2}{4(|r_{34}|^2 + \sigma^2)}}\right).$$

On the other hand, if the fourth layer is not in error, the contribution of the term $r_{34}$ in Equation 6, as far as the error probability for layer 3 is concerned, is effectively zero. Thus, it can be determined that:

$$P[X_3 \neq \hat{X}_3 | X_4 = \hat{X}_4] = Q\left(\frac{|r_{33}|}{\sigma}\right).$$

For large values of x, $Q(x) \approx \exp(-x^2/2)$. For high SNR values, the approximation $P[X_4 = \hat{X}_4] \approx 1$ can be made for the second term in Equation 12. Finally, the following approximations can be made to further reduce the complexity:

$$\log(\exp(-a) + \exp(-b)) \approx -\min(a, b) \text{ and}$$

$$\log(\exp(-a)\exp(-c)) \approx -\max(a, c).$$

With these approximations, the SNR for the third layer may be closely estimated as:

$$SNR_3 \approx \min\left(\frac{|r_{44}|^2}{\sigma^2}, \max\left(\frac{|r_{44}|^2}{\sigma^2}, \frac{|r_{44}|^2}{|r_{34}|^2 + \sigma^2}\right)\right).$$ [Eqn. 13]

Equation 12 may be generalized for the $i^{th}$ layer by adding the necessary additional terms. Thus, the SNR for the $i^{th}$ layer in a MIMO system with L layers may be given by the following algorithm:

$$SNR_i \approx$$

$$\min\left(\frac{|r_{ii}|^2}{\sigma^2}, \max\left(\frac{|r_{i+1,i+1}|^2}{\sigma^2}, \frac{|r_{ii}|^2}{|r_{i,i+1}|^2 + \sigma^2}\right), \ldots, \max\left(\frac{|r_{LL}|^2}{\sigma^2}, \frac{|r_{ii}|^2}{|r_{iL}|^2 + \sigma^2}\right)\right).$$

Figure 6:
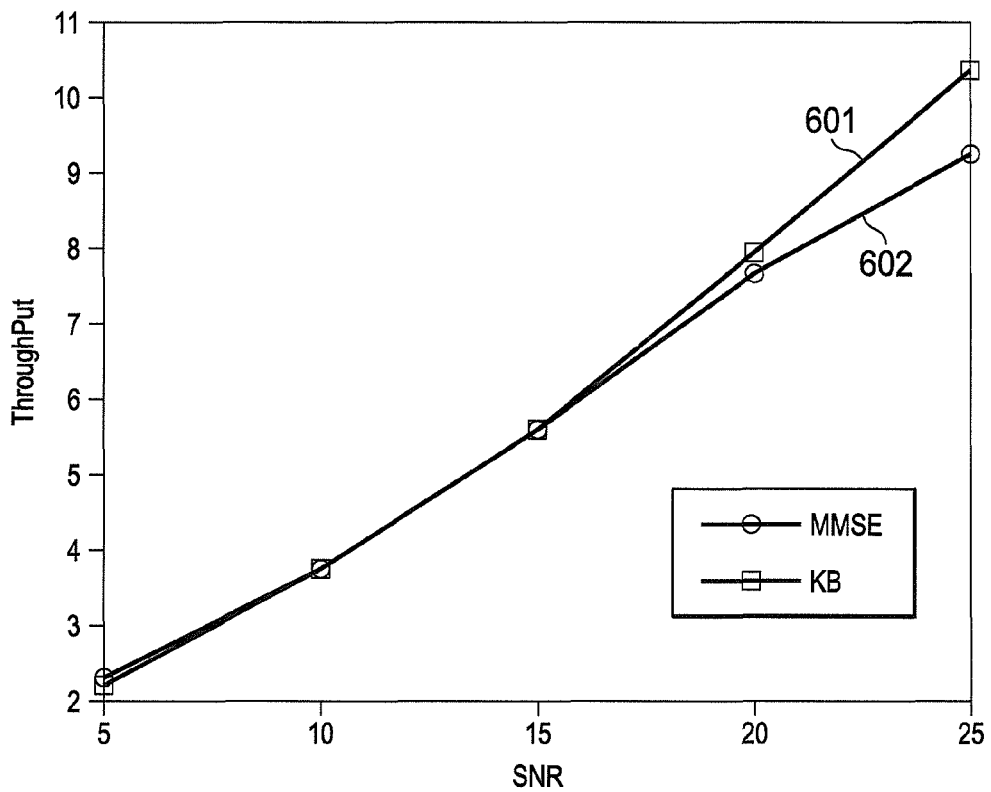
FIG. 6 illustrates comparative performance plots for the K-Best detector using the MMSE based feedback algorithm and the K-Best based feedback algorithm described herein, according to an embodiment of this disclosure.

FIG. 6 illustrates comparative performance plots for the K-Best detector using the MMSE based feedback algorithm and the K-Best based feedback algorithm described herein, according to an embodiment of this disclosure. FIG. 6 depicts results from a scenario from REF3 with a low correlation Doppler 5 Hz EPA channel. Trace 601 represents feedback using the original MMSE algorithm, and trace 602 represents feedback of the K-Best detector using the disclosed algorithm. As shown in FIG. 6, the K-Best detector using the disclosed algorithm gains as much as 3 dB at high SNRs.

Figure 7:
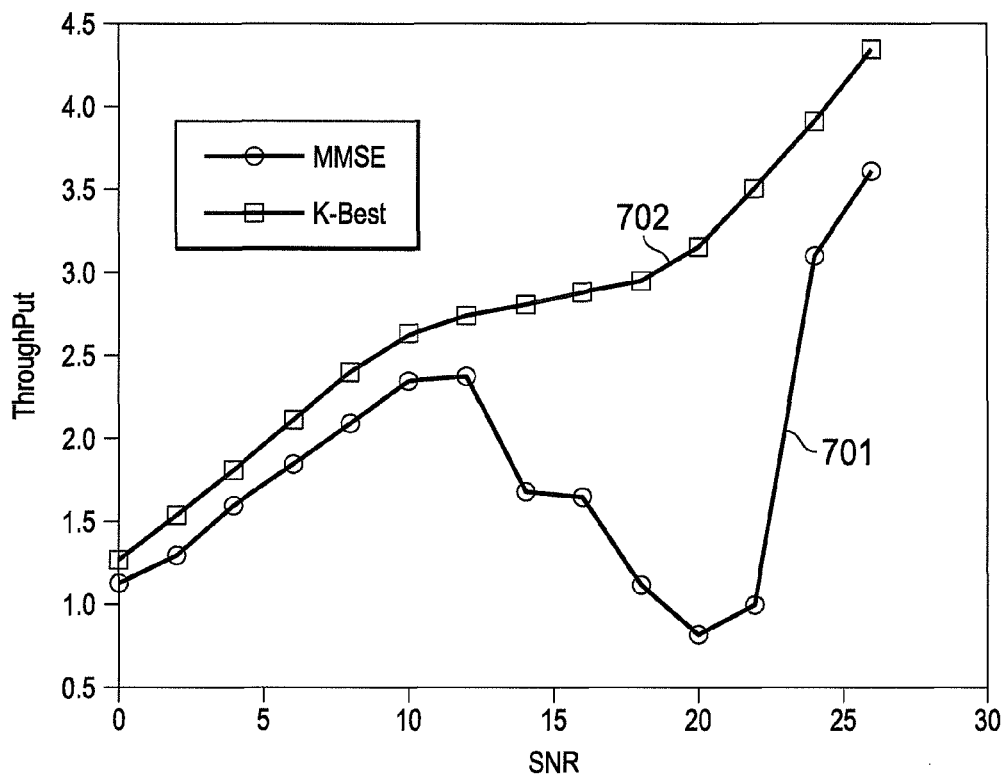
FIG. 7 illustrates a comparison of feedback using a K-Best detector and MMSE feedback, according to an embodiment of this disclosure.

FIG. 7 illustrates a comparison of feedback using a K-Best detector and MMSE feedback, according to an embodiment of this disclosure. FIG. 7 depicts results from another scenario described in REF3, in which the MIMO channel across the different antennas is highly correlated. Trace 701 represents feedback using the original MMSE algorithm, and trace 702 represents feedback of the K-Best detector using the algorithm described herein. As shown in FIG. 7, the MMSE feedback 701 causes performance to degrade even as the SNR rises in the range 10-20 dB. The K-Best detector 702 using the algorithm described herein suffers no such shortcomings and shows consistently superior performance across the SNR range.

The embodiments described above provide a feedback algorithm based upon the K-Best detector. The K-best detector is adaptable for many applications, including for use in LTE-Advanced modem chips. The disclosed embodiments of the feedback algorithm provide increased throughput, improved cellular reception, and improved battery power conservation.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for use in a receiver in a multiple input, multiple output (MIMO) system, the method comprising:
   receiving, from a MIMO transmitter, pilot signals in each MIMO layer;
   estimating the MIMO channel using the received pilot signals and performing a QR decomposition of the estimated MIMO channel;
   predicting a probability of error for each MIMO layer after the QR decomposition of the estimated MIMO channel; and
   determining a corresponding signal-to-noise ratio (SNR) for each MIMO layer based on the probability of error for the each MIMO layer.

2. The method of claim 1, further comprising:
   determining channel quality feedback information based on the determined SNR for each MIMO layer.

3. The method of claim 1, wherein the MIMO system comprises L layers and the SNR for an ith layer among the L layers in the MIMO system is determined based on the probability of error for each layer between the ith layer and the Lth layer, inclusive, wherein L is an integer number.

4. The method of claim 3, wherein the SNR for the ith layer is determined according to the equation:

$$SNR_i \approx \min\left(\frac{|r_{ii}|^2}{\sigma^2}, \max\left(\frac{|r_{i+1,i+1}|^2}{\sigma^2}, \frac{|r_{ii}|^2}{|r_{i,i+1}|^2 + \sigma^2}\right), \ldots, \max\left(\frac{|r_{LL}|^2}{\sigma^2}, \frac{|r_{ii}|^2}{|r_{iL}|^2 + \sigma^2}\right)\right).$$

wherein $r_{ii}$, $r_{i+1,i+1}$, $r_{i,i+1}$, $r_{LL}$, and $r_{iL}$ are values in the QR decomposition of the MIMO channel matrix and $\sigma^2$ is a variance of noise.

5. The method of claim 1, wherein the receiver is a mobile station and the transmitter is a base station in the MIMO system.

6. The method of claim 1, wherein the receiver comprises a K-Best detector.

7. The method of claim 2, wherein the channel quality feedback information comprises at least one of a channel quality index, a precoder matrix index, and a rank index.

8. An apparatus for use in a receiver in a multiple input, multiple output (MIMO) system, the apparatus comprising:
   a processor configured to:
      receive, from a MIMO transmitter, pilot signals in each MIMO layer;
      estimate the MIMO channel using the received pilot signals and perform a QR decomposition of the estimated MIMO channel;
      predict a probability of error for each MIMO layer after the QR decomposition of the estimated MIMO channel; and
      determine a corresponding signal-to-noise ratio (SNR) for each MIMO layer based on the probability of error for the each MIMO layer.

9. The apparatus of claim 8, the processor further configured to:
   determine channel quality feedback information based on the determined SNR for each MIMO layer.

10. The apparatus of claim 8, wherein the MIMO system comprises L layers and the SNR for an ith layer among the L layers in the MIMO system is determined based on the probability of error for each layer between the ith layer and the Lth layer, inclusive, wherein L is an integer number.

11. The apparatus of claim 10, wherein the SNR for the ith layer is determined according to the equation:

$$SNR_i \approx \min\left(\frac{|r_{ii}|^2}{\sigma^2}, \max\left(\frac{|r_{i+1,i+1}|^2}{\sigma^2}, \frac{|r_{ii}|^2}{|r_{i,i+1}|^2 + \sigma^2}\right), \ldots, \max\left(\frac{|r_{LL}|^2}{\sigma^2}, \frac{|r_{ii}|^2}{|r_{iL}|^2 + \sigma^2}\right)\right)$$

wherein $r_{ii}$, $r_{i+1,i+1}$, $r_{i,i+1}$, $r_{LL}$, and $r_{iL}$ are values in the QR decomposition of the MIMO channel matrix and $\sigma^2$ is a variance of noise.

12. The apparatus of claim 8, wherein the receiver is a mobile station and the transmitter is a base station in the MIMO system.

13. The apparatus of claim 8, wherein the receiver comprises a K-Best detector.

14. The apparatus of claim 13, wherein the channel quality feedback information comprises at least one of a channel quality index, a precoder matrix index, and a rank index.

15. A receiver for use in a multiple input, multiple output (MIMO) system, the receiver comprising:
   a plurality of antenna elements; and
   a processor coupled to the plurality of antenna elements, the processor configured to:
      receive, from a MIMO transmitter, pilot signals in each MIMO layer;
      estimate the MIMO channel using the received pilot signals and perform a QR decomposition of the estimated MIMO channel;
      predict a probability of error for each MIMO layer after the QR decomposition of the estimated MIMO channel; and
      determine a corresponding signal-to-noise ratio (SNR) for each MIMO layer based on the probability of error for the each MIMO layer.

16. The receiver of claim 15, the processor further configured to:
   determine channel quality feedback information based on the determined SNR for each MIMO layer.

17. The receiver of claim 15, wherein the MIMO system comprises L layers and the SNR for an ith layer among the L layers in the MIMO system is determined based on the probability of error for each layer between the ith layer and the Lth layer, inclusive, wherein L is an integer number.

18. The receiver of claim 17, wherein the SNR for the ith layer is determined according to the equation:

$$SNR_i \approx \min\left(\frac{|r_{ii}|^2}{\sigma^2}, \max\left(\frac{|r_{i+1,i+1}|^2}{\sigma^2}, \frac{|r_{ii}|^2}{|r_{i,i+1}|^2 + \sigma^2}\right), \ldots, \max\left(\frac{|r_{LL}|^2}{\sigma^2}, \frac{|r_{ii}|^2}{|r_{iL}|^2 + \sigma^2}\right)\right)$$

wherein $r_{ii}$, $r_{i+1,i+1}$, $r_{i,i+1}$, $r_{LL}$, and $r_{iL}$ are values in the QR decomposition of the MIMO channel matrix and $\sigma^2$ is a variance of noise.

19. The receiver of claim 15, wherein the receiver is a mobile station and the transmitter is a base station in the MIMO system.

20. The receiver of claim 15, wherein the receiver comprises a K-Best detector.

* * * * *